UNITED STATES PATENT OFFICE.

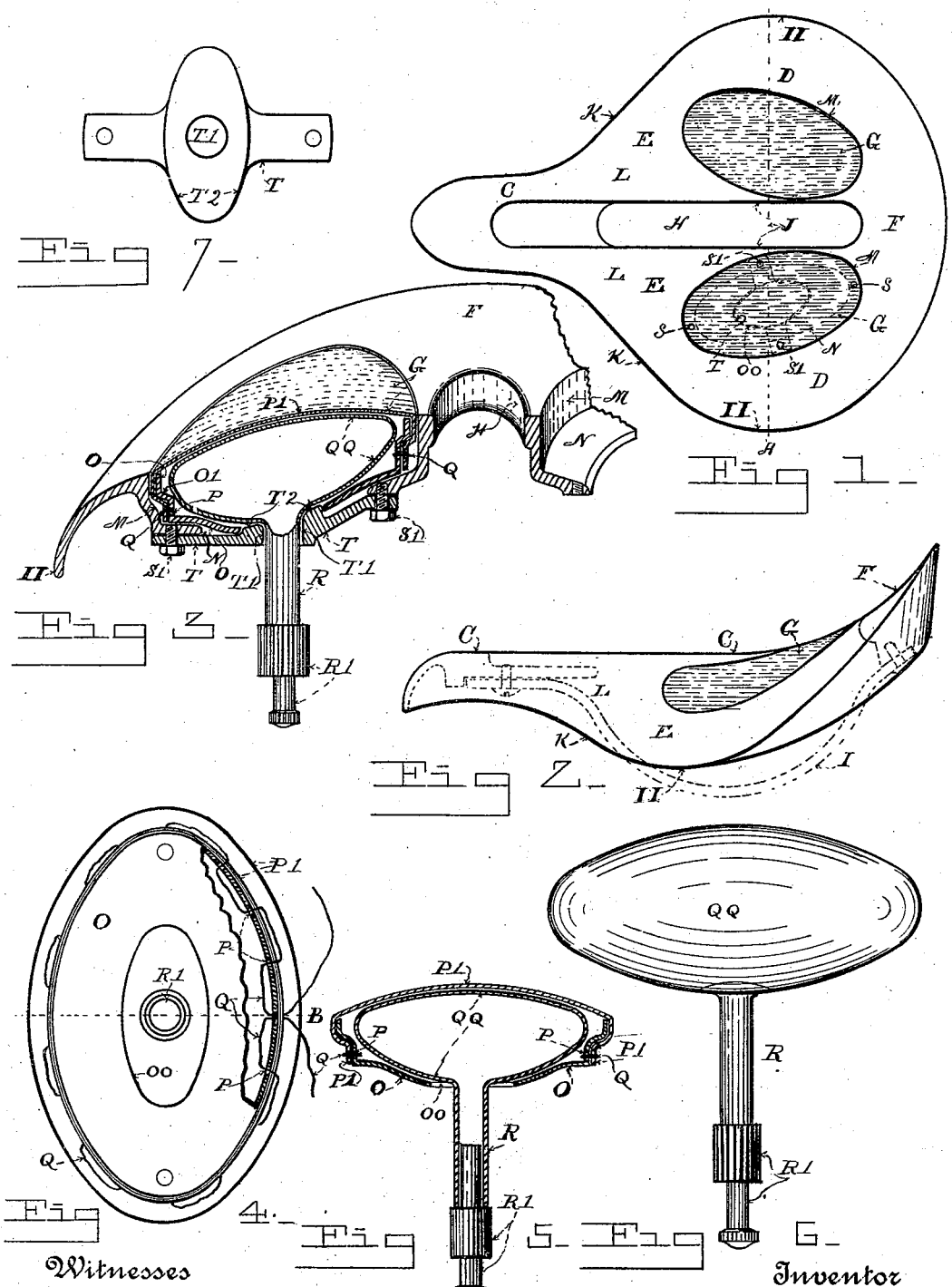

SEYMOUR DOSS VAN METER, OF DENVER, COLORADO.

BICYCLE-SEAT.

SPECIFICATION forming part of Letters Patent No. 556,448, dated March 17, 1896.

Application filed October 10, 1895. Serial No. 565,259. (No model.)

*To all whom it may concern:*

Be it known that I, SEYMOUR DOSS VAN METER, a citizen of the United States of America, residing at Denver, in the county of Arapahoe and State of Colorado, have invented certain new and useful Improvements in Bicycle-Seats; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to bicycle-seats; and the objects of my invention are, first, to provide a solid seat for supporting the body, having an independent air or fluid containing reservoir arranged in the seat to receive the tuber ischii of the rider's body; second, to provide a bicycle-seat having a horn of medium length so arranged in relation to the plane of the seat that in the operating positions of the rider's body it will not bear against the perineum, thereby avoiding injury to this part of the rider, but will project between the rider's limbs and form solely a rigid abutment against lateral movement and displacement of the rider from the seat; third, to provide a solid bicycle-seat having an independent removable air reservoir or chamber arranged in the seat portions of the seat flush with their surfaces in apertures therein which are adapted to receive the tuber ischii of the rider, whereby the said tuber ischii are almost entirely relieved from the weight of the rider's body, which is then supported largely by the solid portions of the seat which engage the buttocks of the rider. I attain these objects by the mechanism illustrated and described in the accompanying drawings and specification, in which—

Figure 1 represents a plan view of my improved bicycle-seat. Fig. 2 represents a side elevation of the same. Fig. 3 represents a section, through Fig. 1 on line A, of a little more than one-half of the saddle. Fig. 4 represents a bottom plan view of the base of the outer casing of the removable air chamber or reservoir. Fig. 5 represents a section of the air-chamber through Fig. 4 on line B. Fig. 6 represents a side elevation of the air-chamber. Fig. 7 represents a plan view of a bridge-piece which is removably secured to the under side of the seat and is adapted to support the central portion of the inner casing of the air-chamber.

Similar letters of reference refer to similar parts throughout the several views.

The principle which I have embodied in my bicycle-seat is directly reverse to those which underlie the construction of all bicycle saddles or seats which seek to form for the rider's body a cushion, pad or elastic or pliable surface, either upon some portion of a rigid or flexible supporting-frame, or which wholly constitutes the seat or saddle itself, and upon which the whole of the seat-engaging portion of the body finds a soft surface.

The principle of my invention consists in providing a seat with a rigid unyielding surface which conforms to the natural curves of the body while in riding position upon the bicycle for the buttocks to rest upon and against, and a rigid horn blending out from said surfaces centrally between them and projecting forward between the rider's limbs in a plane horizontal to the axis of the bicycle's wheels and having a solid point curved downward adapted to form a lateral abutment for the limbs of the body a short distance below the perineum; a high cantle blending upward from the horn and said rigid buttock-supporting surfaces adapted to support the upper portion of the buttocks, and perforations through the seat portions directly under the tuber ischii, in which is secured in suitable casings a body of fluid, preferably air or water. The tuber ischii sink into these fluid reservoirs or chambers and are relieved from a great portion of the weight of the body, which now comes on the fleshy portions of the buttocks and on the rigid surfaces of the seat, the conditions being directly opposite to those seats in which the tuber ischii carry all the weight of the body, as in cushions, pads, and elastic devices. This arrangement allows a firm and easy seat for the rider, and the tuber ischii are greatly relieved from the pressure of the body.

Referring to Figs. 1 and 2, C designates the horn of the seat, D and E the seat portions, F the cantle, and G the fluid reservoir or chamber.

As curves form an important part of my seat I will first describe their direction. The top of the horn is straight and rounded downward at its point and also inward from its sides and is also convexed or oval in cross-section. It is of sufficient length to extend between the rider's limbs to form a lateral abutment. It is arranged and formed to project from the seat portions at such an angle to the seat portions as will prevent its bearing against the perineum. It extends back into the seat in a horizontal line and blends into an upward curve, which forms the cantle. This rises from one and one-half to three inches above its level. The top of the horn is flat at the union with the cantle curve, and a long slot H is made in it to reduce the amount of metal in the seat and for ventilation. The front end of the horn and the back end of the seat on their under sides are arranged to receive and be secured to a spring-bar I, by which it is secured to a bicycle. The horn at from two to three inches from its end curves outward at oblique opposite angles. The side edges, I I, and the cantle are then curved concentric to a central point in the horn.

The seat is of ample breadth transversely of the horn to receive the full width of the buttocks, and its depth from the cantle to its inner edges, K, is made to receive only the buttocks, which arrangement leaves the limbs perfectly free to act on the pedals. From the center J of the horn the seat portions curve downward toward the sides I I and toward the inner edges, K, thereby forming a curved valley at L and a curved surface from the air-reservoir to the extreme edge of the seat, thus making a seat entirely free from sharp corners. I cast the saddle preferably of aluminum, but can use any suitable material in its construction. In each seat portion I cast a perforation M, (see Fig. 3,) the bottom of which is provided with an introverted lip N. I preferably make these perforations either approximately round or oval in outline.

O designates an independent metal cup-shaped casting adapted to fit into said perforations and rest on the lip N. A bottom plan view of this cup-piece is shown in Fig. 4. Through its center a perforation O O is made. The top edge of the cup-piece is projected outward all around to form a step O', and around the lower portion of the sides a row of holes P is made. Over the top of the cup-piece (see Fig. 5, which is a cross-section of Fig. 4) I place a piece of leather P', securing it by carrying it down the sides and around the step of the cup, and then lacing it to the cup-piece with a cord Q, which I intertwine through holes in it formed to register with those in the cup-piece, as shown in Fig. 4, and then tie the ends of the cord together. This cup-piece and the leather cap form the outer casing of the fluid chamber or reservoir. In this outer casing I place a flexible rubber sack Q Q, inserting it through the aperture in the bottom of the cup-piece. A tube R containing a valve R' depends from the rubber sack. I secure the cup-piece to the lip N by screws S at each end, (see Figs. 1 and 4,) and to the said lip I also secure with screws S' a bridge-piece T, which is formed with an aperture T' through it, through which the air tube and valve depend, and with a projecting portion T² concentric to its air-valve-containing aperture which fits into the aperture in the bottom of the cup-piece, as shown in Fig. 3, a plan view of the bridge being shown in Fig. 7, in which view it is adapted to the form of the aperture T'. (Shown in Fig. 4.) This bridge supports the fluid-reservoir at this point and prevents its working out of the outer casing through the aperture in the bottom of the cup-piece. I then fill the reservoir with air or water, but do not inflate it above a slight pressure, the object being to place under and around the tuber ischii a fluid medium, in which they sink and which will support them laterally on all sides, and which will move or surge with them without friction when the body rocks slightly when riding fast, and which would relieve them of a portion of the rider's weight and bring the fleshy portions of the buttocks in supporting-contact with the rigid portion of the seat. For this reason I do not carry the outer casing of the reservoirs above the surfaces of the seats, and when the reservoirs are full of air and unoccupied by the rider the top of the reservoir is level with the contour of the seats, although its center would be convexed slightly above it.

This saddle is light, durable, and inexpensive to make, and makes an easy and firm seat.

Having described my invention, what I claim as new, and desire to secure by Letters Patent, is—

1. A bicycle-seat comprising a cast frame having two seat portions, a horn extending in a horizontal line forward from between the seat portions having a slot in its top and a downward-curved point, a high cantle blending upward from said seat and horn portions, perforations in said seat portions having an introverted lip at their bottom edge, and an air-reservoir comprising a rubber sack with an inlet tube and valve, a suitable casing for said sack adapted to said perforations, and means for removably securing said casing in said perforations.

2. A cast bicycle-seat having rigid seat portions curving upward and forming a cantle, a horn blending forward by curved lines from said seat portions in a straight line, a slot projecting through the top of said horn intermediate of its point and the said cantle, perforations through the said seat portion adapted to register with the tuber ischii of the rider, an air-holding sack having a valve-controlled inlet, a casing substantially as herein described surrounding said sack and adapted to fit said perforations even with the surfaces of said seat portions, a perforation in the bottom of said casing through which said sack is introduced into said casing, means for detachably securing said air-sack and casing in said perforations, and an independent bridge-piece secured to said seat and arranged and adapted to close the said aperture in the bottom of said casing, substantially as described.

3. The combination in a bicycle-seat of a cast frame having the solid seat, an upward-curved cantle blending therefrom, a horn having a central top slot in its central portion, and a solid downward-curved point, a perforation cast through the center of each seat portion having an introverted lip at its lower end, with an air-reservoir comprising an air-containing sack, a casing surrounding said sack adapted to fit in each seat and having a metal base and a pliable top detachably secured thereto, means for securing said reservoir in said perforations, means for introducing said air-sack into said casing, the several parts being arranged and combined substantially as herein set forth and described.

4. The combination in a bicycle-seat of the rigid seats the upward-curved cantle-support, the horn, the perforation through said seats, the rubber air-sacks, the metal cup-piece adapted to fit said perforations, the leather covering, means for detachably securing said covering to said cup-piece and the bridge-piece, as set forth.

5. The combination in a rigid bicycle-seat, of a cast seat having a contour substantially as herein set forth, and having perforations through its seat portions provided with an introverted lip, independent cup-shaped pieces, of metal fitting in said perforations, means for securing said cup-pieces to said introverted lips, a row of holes in the side of said cup-pieces, leather coverings over said cup-pieces having holes registering with those in said cup-pieces, a cord adapted to pass through said holes and gather and secure by tying said leather covers to said cup-pieces, perforations in the bottom of said cup-pieces, a rubber sack having an air-inlet tube and valve adapted to be passed through said apertures in said cup-pieces and fit the chamber formed by said cup-pieces and said leather covers, and a bridge-piece having an aperture through which said air-valves depend and a projection extending into said aperture in the bottom of said cup-pieces, and means for securing said bridge-piece to said introverted lip of said seat-apertures, substantially as described.

In testimony whereof I affix my signature in presence of two witnesses.

SEYMOUR DOSS VAN METER.

Witnesses:
CARL R. FULLER,
NEWARK L. BURTON.